Figure 2:
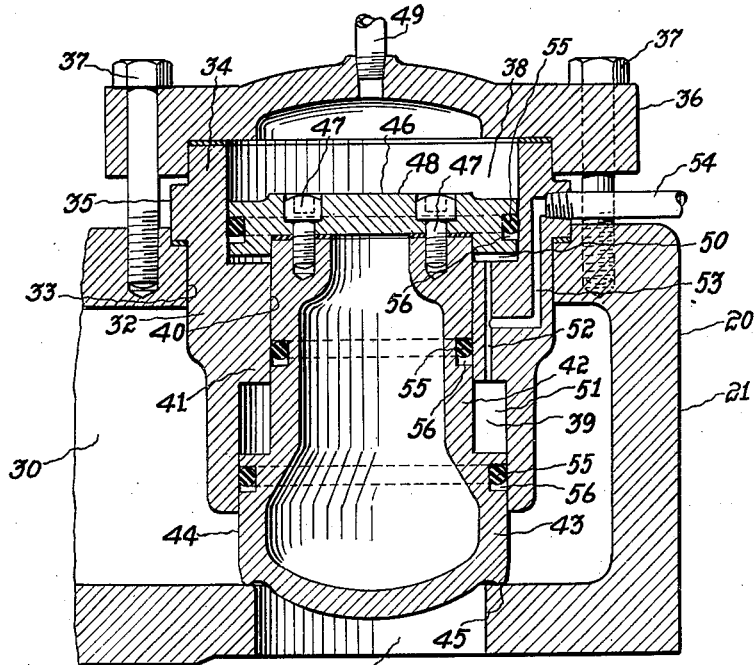

May 2, 1950

C. W. METZGAR 2,506,162

CLEARANCE VALVE ASSEMBLY

Filed Aug. 14, 1946

INVENTOR
Chester W. Metzgar
BY
HIS ATTORNEY.

Patented May 2, 1950

2,506,162

UNITED STATES PATENT OFFICE 2,506,162

CLEARANCE VALVE ASSEMBLY

Chester W. Metzgar, Easton, Pa., assignor to Ingersoll-Rand Company, New York, N. Y., a corporation of New Jersey Application August 14, 1946, Serial No. 690,351

1 Claim. (Cl. 137—153)

This invention relates to compressors, and more particularly to a clearance valve assembly for machines of this type.

The objects of the invention are to obtain an efficient, compact and rugged clearance valve, to assure the adequate cushioning of the valve in order to prevent it from striking with damaging effect against the valve stopping surfaces, and to effectively seal the cooperating movable and stationary surfaces of the valve assembly.

Other objects will be in part obvious and in part pointed out hereinafter.

Figure 1:
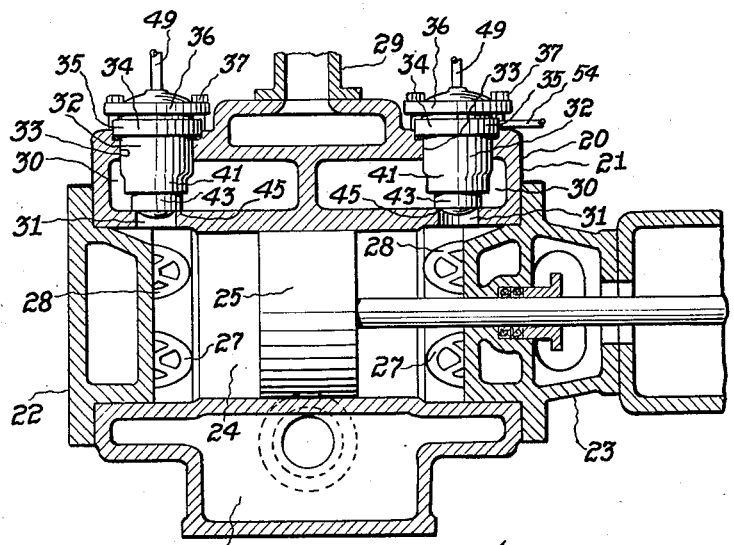

In the drawings accompanying this specification and forming a part thereof,

Figure 1 is a longitudinal elevation, partly broken away, of a compressor equipped with a clearance valve assembly constructed in accordance with the practice of the invention, and Figure 2 is a sectional elevation, somewhat enlarged, of the clearance valve assembly and a fragmentary portion of a compressor embodying it.

Referring more particularly to the drawings, 20 designates a compressor shown as being of the double acting type and comprising a cylinder 21 having end heads 22 and 23 to form closures for the ends of a piston chamber 24. The piston chamber contains a reciprocatory piston 25 for compressing fluid medium entering the piston chamber 24, from an inlet chamber 26, through inlet valves 27. The fluid thus compressed passes through discharge valves 28 and through passages (not shown) in the cylinder to a discharge conduit 29.

The cylinder 21 has a pair of clearance pockets 30, one for each end of the piston chamber 24, communicating with the piston chamber through ports 31 that are controlled by clearance valve assemblies 32 constructed in accordance with the practice of the invention. Each valve assembly 32 is disposed in an aperture 33 in the outer wall of the cylinder 21, coaxially with the port 31, and comprises a guide member 34 having an external flange 35 that is pressed against the wall of the cylinder by a cover 36 on the outer end of the guide member 34 and bolts 37 extending through the cover and threaded into the cylinder.

The guide 34 is hollow throughout and is bored to provide enlarged portions 38 and 39 that open from the opposite ends of the guide member and are connected by a reduced portion 40 that is defined by an annular flange 41 in the intermediate portion of the guide. The reduced portion 40 serves as a guide for the body 42 of a reciprocatory valve 43 having a head 44 slidable in the portion 39 and an annular seating surface 45 at the free end of the head 44 for sealing engagement with the wall of the cylinder around the adjacent end of the port 31.

The valve 43 is further provided with a head 46 that is slidable in the bore 38 and is shown as a disc that is detachably connected to the end of the valve body by screws 47. The head 46 is of somewhat larger diameter than the head 44 and its outer surface constitutes a pressure area 48 co-extensive with the head and against which pressure fluid normally acts for holding the valve in position to seal the port 31. The pressure fluid serving this purpose is conveyed to the enlarged portion 38 by a conduit 49 connected to the cover 36 and leading from a suitable source of supply, as for example the storage receiver (not shown) into which the compressor discharges.

Suitable and well known controlling means (not shown) may be interposed in the conduit 49 to automatically supply pressure fluid to the enlarged portion 38 for holding the valve closed during the time when the storage pressure is below the predetermined maximum value and to exhaust the pressure fluid from the portion 38 whenever such pressure value is reached to permit the valve 43 to open for communicating the piston chamber 24 with a clearance pocket 30.

To the end that the valve 43 may be restrained from striking sharply against the cover 36 and the wall of the cylinder a constant supply of cushioning fluid is maintained in the spaces or chambers 50 and 51 between the flange 41 and the opposed surfaces of the heads 46 and 44, and said chambers are in constant communication with each other through a passage 52 in the flange 41. The passage 52 is of small flow area so that the transfer of cushioning medium from one chamber to the other will take place at a sufficiently low rate to cushion the movements of the valve. The fluid medium serving this purpose is conveyed to the chambers 50 and 51 by a passage 53 opening into the passage 52 and into a conduit 54 connected to the guide member 34 and leading from a suitable source of supply, as for example from the intercooler of a multi-stage compressor.

In order to prevent the leakage of fluid along the cooperating surfaces of the valve heads and the walls of the bores containing them and also from one cushioning chamber to another along the valve body 42 the heads 44—46 and the body 42 carry sealing members 55 arranged in annular grooves 56 in the peripheries of the heads and of greater width than depth. The sealing members 55 are of a known type made of rubber or rubber composition and of circular cross section and have a diameter through the cross section greater than the depth and smaller than the width of the grooves so that the sealing members will be compressed somewhat between the bottoms of the grooves 56 and the walls of the bore in the guide member. Owing to this arrangement, and as is well understood, the sealing members will be caused to turn or rotate in the grooves, by the surfaces of the guide member during the movements of the valve so that no localized wear will occur on the sealing members.

Normally, during the operation of the device, and with the pressure in the storage receiver into which the compressor discharges below the maximum predetermined value which it is intended to maintain therein, the pressure fluid acting against the pressure area 48 will hold the valve 43 in position to maintain the annular seating surface 45 of the valve firmly against the cylinder wall for sealing the clearance pocket 30 from the piston chamber 24. All of the discharge output of the compressor then passes through the discharge valves 28 to the storage receiver, and when the receiver pressure reaches the predetermined maximum value the means serving to control the conduit 49 will operate to exhaust the pressure fluid from the enlarged portion 38 of the bore. The pressure fluid in the piston chamber 24, and to which the head 44 is subjected, will then unseat the valve and thereby communicate the end of the piston chamber with the clearance pocket 30.

During such opening movement of the valve 43 the cushioning fluid in the chamber 51 will be compressed in a sufficient degree, by the head 44, to cushion the movement of the valve and is ejected gradually from the chamber 51 through the passage 52 into the chamber 50 and to the passage 53. Similarly, when pressure fluid is again supplied to the pressure area 48 for closing the valve the cushioning medium will be ejected from the chamber 50, through the passage 52 to the chamber 51 and associated passages, at a sufficiently slow rate to assure a smooth closing movement and a gentle seating of the valve.

I claim:

A clearance valve assembly, comprising a guide member having a bore therethrough, a valve member reciprocable in the bore, means on the members cooperating with each other to define a pair of opposed cushioning chambers in the bore, a restricted passage in the guide member for conveying cushioning fluid from one chamber to another to cushion the opening and closing movements of the valve member, sealing members in one of the said members for sealing the ends of the bore, a sealing member in one of the members cooperating with the other member for preventing the leakage of fluid through the bore from one chamber to another, and a passageway in the guide member opening into the restricted passage for conveying fluid under pressure to the cushioning chambers.

CHESTER W. METZGAR.

REFERENCES CITED

The following references are of record in the file of this patent:

UNITED STATES PATENTS

| Number | Name | Date |
|---|---|---|
| 758,020 | Robinson | Apr. 19, 1904 |
| 929,007 | Phillips | July 27, 1909 |
| 1,022,171 | Ballard | Apr. 2, 1912 |
| 1,422,476 | Prellwitz | July 11, 1922 |
| 1,979,746 | Kenneweg | Nov. 6, 1934 |
| 2,423,677 | Balogh | July 8, 1947 |